US009989078B2

(12) United States Patent
Taira et al.

(10) Patent No.: US 9,989,078 B2
(45) Date of Patent: Jun. 5, 2018

(54) SWIRLING JET ACTUATOR FOR CONTROL OF SEPARATED AND MIXING FLOWS

(71) Applicant: The Florida State University Research Foundation, Inc., Tallahassee, FL (US)

(72) Inventors: Kunihiko Taira, Tallahassee, FL (US); Farrukh Alvi, Tallahassee, FL (US); Phillip Munday, Niceville, FL (US)

(73) Assignee: The Florida State University Research Foundation, Inc., Tallahassee, FL (US)

( * ) Notice: Subject to any disclaimer, the term of this patent is extended or adjusted under 35 U.S.C. 154(b) by 108 days.

(21) Appl. No.: 15/250,330

(22) Filed: Aug. 29, 2016

(65) Prior Publication Data

US 2017/0016462 A1 Jan. 19, 2017

Related U.S. Application Data

(63) Continuation of application No. PCT/US2015/017945, filed on Feb. 27, 2015.

(60) Provisional application No. 61/947,164, filed on Mar. 3, 2014.

(51) Int. Cl.

| | |
|---|---|
| ***B64C 21/00*** | (2006.01) |
| ***F15D 1/00*** | (2006.01) |
| ***F15D 1/12*** | (2006.01) |
| ***B64C 21/08*** | (2006.01) |

(52) U.S. Cl.

CPC .............. *F15D 1/009* (2013.01); *B64C 21/08* (2013.01); *F15D 1/007* (2013.01); *F15D 1/12* (2013.01)

(58) Field of Classification Search

CPC ......... B64C 21/00; B64C 21/02; B64C 21/04; B64C 21/08; F15D 1/002; F15D 1/007; F15D 1/008; F15D 1/009; F15D 1/0015; F15D 1/12

See application file for complete search history.

(56) References Cited

U.S. PATENT DOCUMENTS 7,686,257 B2 * 3/2010 Saddoughi ................ B05B 1/08 244/198
7,967,258 B2 * 6/2011 Smith ..................... B64C 21/08 239/102.2

OTHER PUBLICATIONS

International Search Report for PCT application No. PCT/US15/17945 with an International filing date of Feb. 27, 2015, and dated Nov. 24, 2015.

Gad-el Hak, M. and Bushnell, D. M., “Separation rontrol: review,” Journal of Fluids Engineering, vol. 113, No. 5, Mar. 1991, pp. 5-30.

(Continued)

*Primary Examiner* — Richard G Davis

(74) *Attorney, Agent, or Firm* — Nicholas Pfeifer; Smith & Hopen, P. A.

(57) ABSTRACT

The present invention includes a method of controlling a fluid flow using momentum and/or vorticity injections. Actively controlling an actuator allows for direct, precise, and independent control of the momentum and swirl entering into the fluid system. The perturbations are added to the flow field in a systematic mater providing tunable control input, thereby modifying behavior thereof in a predictable manner to improve the flow characteristics.

15 Claims, 12 Drawing Sheets
(7 of 12 Drawing Sheet(s) Filed in Color)

(56) References Cited

OTHER PUBLICATIONS

Greenblatt, D. and Wygnanski, I., "The control of flow separation by periodic excitation," Prog. Aero. Sci., vol. 36, 2000, pp. 487-545.
Cattafesta, L., Song, Q., Williams, D., Rowley, C., and Alvi, F., "Active control of flow-induced cavity oscillations," Progress in Aerospace Sciences, vol. 44, 2008, pp. 479-502.
Cattafesta, L. N. and Sheplak, M., "Actuators for active flow control," Annu. Rev. Fluid Mech., vol. 43, 2011, pp. 247-272.
Wu, J.-Z., Lu, X.-Y., Denny, A. D., Fan, M., and Wu, J.-M., "Post-stall flow control on an airfoil by local unsteady forcing," J. Fluid Mech., vol. 371, 1998, pp. 21-58.
Glezer, A. and Amitay, M., "Synthetic jets," Annu. Rev. Fluid Mech., vol. 34, 2002, pp. 503-529.
Corke, T. C., Enloe, C. L., and Wilkinson, S. P., "Dielectric barrier discharge plasma actuators for flow control," Annual Review of Fluid Mechanics, vol. 42, 2010, pp. 505-529.
Compton, D. A. and Johnston, J. P., "Streamwise vortex production by pitched and skewed jets in a turbulent boundary layer," AIAA Journal, vol. 30, 1992, pp. 640-647.
Selby, G. V., Lin, J. C., and Howard, F. G., "Control of low-speed turbulent separated flow using jet vortex generators," Experiments in Fluids, vol. 12, 1992, pp. 394-400.
Zhang X. "The evolution of co-rotating vortices in a canonical boundary laryer with inclined jets," Physics of Fluids, vol. 15, No. 12, Dec. 2003, pp. 3693-3702.
Pedro, H. T. C. and Kobayashi, M. H., "Numerical study of stall delay on humpback whale flippers," AIAA Paper 2008-0584, 2008, pp. 1-8.
Kerho, M., Hutcherson, S., Blackwelder, R. F., and H., L. R., "Vortex generators used to control laminar separation bubbles," Journal of Aircraft, vol. 30, No. 3, May-Jun. 1993, pp. 315-319.
Lin, J. C., "Review of research on low-profile vortex generators to control boundary-layer separation," Progress in Aerospace Science, vol. 38, 2002, pp. 389-420.
Bechert, D., Bruse, M., Hage, W., and Meyer, R., "Biological surfaces and their technological application—Laboratory and Flight Experiments on Drag Reduction and Separation Control," AIAA Paper 1997-1960, 1997, pp. 1-34.
Choi, H., Moin, P., and Kim, J., "Direct numerical simulation of turbulent flow over riblets," Journal of Fluid Mechanics, vol. 255, 1993, pp. 503-539.
Gaster, M., "On the generation of spatially growing waves in a boundary layer," Journal of Fluid Mechanics, vol. 22, 1965, pp. 433-441.
Liepmann, H. W., Brown, G. L., and Nosenchuck, D. M., "Control of laminar-instability waves using a new technique," Journal of Fluid Mechanics, vol. 118, 1982, pp. 187-200.
Goldstein, D., Handler, R., and Sirovich, L., "Direct numerical simulation of turbulent flow over a modelled riblet covered surface," Journal of Fluid Mechanics, vol. 302, 1995, pp. 333-376.
Kim, J., "Control of turbulent boundary layers," Journal of Fluid Mechanics, vol. 15, No. 5, May 2003, pp. 1093-1105.
Kravchenko, A. G., Haecheon, C., and Moin, P., "On the relation of near-wall streamwise vortices to wall skin friction in turbulent boundary layers," Physics of Fluids, vol. 5, 1993, pp. 3307-3309.
Schubaur, G. B. and Spangenberg, "Forced mixing boundary layers," Journal of Fluid Mechanics, vol. 8, 1960, pp. 10-32.
Liepmann, H. W. and Nosenchuck, D. M., "Active control of laminar-turbulent transition," Journal of Fluid Mechanics, vol. 118, 1982, pp. 201-204.
Shabaka, I. M. M. A., Mehta, R. D., and Bradshaw, P., "Longitudinal vortices imbedded in turbulent boundary layer. Part 1. Single vortex," Journal of Fluid Mechanics, vol. 155, 1985, pp. 37-57.
Morinishi, Y., Lund, T. S., Vasilyev, O. V., and Moin, P., "Fully conservative high order finite difference schemes for incompressible flow," Journal of Computational Physics, vol. 143, 1998, pp. 90-124.
Vreman, A. W, "An eddy-viscosity subgrid-scale model for turbulent shear flow: algebraic theory and applications," Physics of Fluids, vol. 16, 2004, pp. 3670-3681.
Germano, M. Piomelli, U., Moin, P., and Cabot, W. H., "A dynamic subgrid-scale eddy viscosity model," Physics of Fluids, vol. 3, No. 7, 1991, pp. 1760-1765.
Kim, J. and Moin, P., "Application of a fractional-step method to incompressible Navier-Stokes equations," Journal of Computational Physics, vol. 59, 1985, pp. 308-323.
Kojima, R., Nonomura, T., Oyama, A., and Fujii, K., "Large-eddy simulation of low-Reynolds-number flow over thick and thin NACA airfoils," Journal of Aircraft, vol. 50, No. 1, 2013, pp. 187-196.
Seifert, A., and Pack, L T., "Oscillatory excitation of unsteady compressible flows over airfoils at flight Reynolds numbers," No. 10.2514/6.1999-925, AIAA, 1999.
Gilarranz, J. L., Traub, L. W., and Redinoitis, O. K., "A new class of synthetic jet actuators—Part II: application to flow separation control," Journal of Fluids Engineering, vol. 127, Mar. 2005.
Deng S., Jiang, L., and Liu, C., "DNS for flow separation control around an airfoil by pulsed jets," Computers and Fluids, vol. 36, No. 6, 2007, pp. 1040-1060.
You, D., Ham, F., and Moin, P., "Discrete conservation principles in large-eddy simulation with application to separation control over an airfoil," Physics of Fluids, vol. 20, Oct. 2008.

* cited by examiner

SWIRLING JET ACTUATOR FOR CONTROL OF SEPARATED AND MIXING FLOWS

CROSS-REFERENCE TO RELATED APPLICATIONS

This non-provisional application is a continuation of currently pending PCT application No. PCT/US2015/017945 filed Feb. 27, 2015, which claims priority to provisional application No. 61/947,164, entitled "SWIRLING JET ACTUATOR FOR CONTROL OF SEPARATED AND MIXING FLOWS," filed Mar. 3, 2014 by the same inventors.

FEDERALLY SPONSORED RESEARCH OR DEVELOPMENT

This invention was made in part with Government support under Grant No. FA9550-13-1-0183 awarded by the United States Air Force Office of Scientific Research Young Investigator Program. The government has certain rights in the invention.

BACKGROUND OF THE INVENTION

1. Field of the Invention

This invention relates to the control of a fluid flow. More specifically, it relates to the direct, precise, and independent control of momentum and swirl entering into the fluid system.

2. Brief Description of the Related Art

In past studies, flow control has been implemented to improve the performance of aerodynamic bodies in terms of lift increase and drag reduction, to increase mixing in combustion processes, and to reduce noise from moving bodies. Enhanced performance is primarily accomplished by reducing the size of the region with flow separation. The root of flow separation over a body stems from boundary layer separation, [1], [2] especially for flows exposed to adverse pressure gradient [3], [4]. Depending on the geometry and flow conditions, the separated boundary layer can either remain separated over the length of the body or reattach downstream. The separated flow region is detrimental to on the performance an airfoil. Therefore, the fundamental goal of flow control, in general, on an airfoil is to deter the boundary layer from separating. Flow control devices attempt to increase the momentum in the boundary layer to oppose the adverse pressure gradient. With appropriate control effort, the flow can remain attached over the entire suction surface of the airfoil, thus enhancing performance.

Flow control actuators are utilized to introduce perturbations to the flow, and can be categorized into two types of devices: active and passive actuators [5], [8]. Active flow control is defined as the addition of energy to the flow. A large assortment of active flow control devices are discussed in the review by Cattafesta and Sheplak [6]. Active flow control devices include steady blowing/suction [3], [9], synthetic jets [10], plasma actuators [11], vortex generator jets [12], [14], and others. Passive flow control devices modify the flow without the need of energy input. Specific types of passive actuators consist of wavy leading edge [15], vortex generators [16], [17], and riblets [18], [19]. These devices listed above do not encompass all of the devices that have been developed, but give an idea of the extent of the variety of actuators that have been developed.

Numerous works have been performed for both laminar [20], [21] and turbulent [19], [22], [24] boundary layer control. Additional focus has also been placed on controlling the transition of a boundary layer from laminar to turbulent [25], [26]. While there are a wide variety of flow control devices available, what the surrounding flow receives from the actuators can be simply considered as a combination of mass, momentum, vorticity, or energy. The present invention includes momentum and vorticity injection to alter the separated flow over an airfoil. Momentum injection reattaches the flow by adding momentum directly to the boundary layer. Vortex generators pull high momentum fluid from the free stream [27]. Due to inherent coupling, there is also an inherent momentum injection related to vortex generators due to the geometry deflecting the flow.

One major drawback of the existing flow control actuators is associated with their incapability to control the actuation momentum and swirl separately. Flow control actuators currently known in art are only capable of providing a fixed combination of the momentum and swirl, with most commonly used actuators focusing exclusively on linear momentum injection.

Accordingly, what is needed is method of controlling fluid flow by introducing momentum and swirl (or vorticity) into the flow and adjusting the momentum and swirl independently to alter the characteristics of the fluid flow. However, in view of the art considered as a whole at the time the present invention was made, it was not obvious to those of ordinary skill in the field of this invention how the shortcomings of the prior art could be overcome.

All referenced publications are incorporated herein by reference in their entirety. Furthermore, where a definition or use of a term in a reference, which is incorporated by reference herein, is inconsistent or contrary to the definition of that term provided herein, the definition of that term provided herein applies and the definition of that term in the reference does not apply.

While certain aspects of conventional technologies have been discussed to facilitate disclosure of the invention, Applicants in no way disclaim these technical aspects, and it is contemplated that the claimed invention may encompass one or more of the conventional technical aspects discussed herein.

The present invention may address one or more of the problems and deficiencies of the prior art discussed above. However, it is contemplated that the invention may prove useful in addressing other problems and deficiencies in a number of technical areas. Therefore, the claimed invention should not necessarily be construed as limited to addressing any of the particular problems or deficiencies discussed herein.

In this specification, where a document, act or item of knowledge is referred to or discussed, this reference or discussion is not an admission that the document, act or item of knowledge or any combination thereof was at the priority date, publicly available, known to the public, part of common general knowledge, or otherwise constitutes prior art under the applicable statutory provisions; or is known to be relevant to an attempt to solve any problem with which this specification is concerned.

BRIEF SUMMARY OF THE INVENTION

The long-standing but heretofore unfulfilled need for method of independently inputting vorticity and momentum into a fluid flow, in a manner where both can be independently controlled, to alter the flow characteristics is now met by a new, useful, and nonobvious invention.

The novel structure includes a method of controlling a fluid flow by inputting a momentum and a vorticity into a fluid flow. In a certain embodiment, the input of the momentum and/or the vorticity is actively controlled, independent to one another, to allow varying amounts of vorticity and momentum with respect to each other. In a certain embodiment, the momentum and/or vorticity is inputted in an orientation that is normal to a surface of a body over which the fluid flow is passing. In a certain embodiment, the inputted vorticity is tuned through the axial component, where the axial direction is aligned with the centerline of an injection port.

The inputs preferably occur near the time-averaged separation point on a body over which the fluid flow is passing. A certain embodiment may include a plurality of actuator sites wherein each actuator site includes a vorticity input and each vorticity input has an initial direction of rotation. The initial direction or rotation of each vorticity input may be opposite of the initial direction of rotation of the vorticity input of an adjacently located actuator site. In a certain embodiment, the initial direction of rotation of each vorticity input may have the same initial direction of rotation of the vorticity input of an adjacently located actuator site.

These and other important objects, advantages, and features of the invention will become clear as this disclosure proceeds.

The invention accordingly comprises the features of construction, combination of elements, and arrangement of parts that will be exemplified in the disclosure set forth hereinafter and the scope of the invention will be indicated in the claims.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

For a fuller understanding of the invention, reference should be made to the following detailed description, taken in connection with the accompanying drawings, in which.

DETAILED DESCRIPTION OF THE PREFERRED EMBODIMENT

In the following detailed description of the preferred embodiments, reference is made to the accompanying drawings, which form a part thereof, and within which are shown by way of illustration specific embodiments by which the invention may be practiced. It is to be understood that other embodiments may be utilized and structural changes may be made without departing from the scope of the invention.

Figure 1:
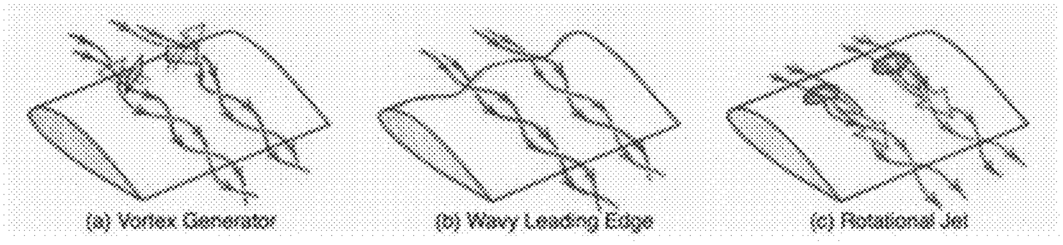
FIG. 1 is a diagram schematically representing the changes in fluid flow over an airfoil due to vortex generator, wavy leading edge, and rotational (swirling) jet.

Flow control actuators modify flow by adding perturbations. There are two general categories of flow control: active and passive. Some examples of active flow control actuators are steady jet, pulsed jet, plasma actuators, and MEMS. The passive flow control may be achieved through vortex generation, leading edge modification, roughness, etc. Regardless of the type of actuator used, the flow field experiences added perturbations in terms of momentum, vorticity, mass, and energy. The flow fields over an airfoil for vortex generator, wavy leading edge, and rotational jet are shown in FIG. 1.

The present invention includes a method of controlling fluid flow by inputting linear momentum and vorticity into the fluid flow. A certain embodiment includes an active flow control actuator that allows for direct, precise, and independent control of the amount of linear momentum (and mass) as well as wall-normal/angled momentum rotational motion/vorticity (swirl) entering into the fluid system. The invention adds the perturbations to the flow field in a systematic manner. Such actuation provides tunable control input to perturb the vortical/turbulent external or internal flow to modify the behavior of the flow in a controlled manner.

Compared to existing flow control actuators, which are not capable of controlling the actuation momentum and swirl separately, the method of the present invention may include injecting these quantities as needed in an active, predictable, and independent manner.

The use of tunable swirl can improve the efficiency and effectiveness of modifying the flow field with a lower required input. In a certain embodiment, the method employs an active flow control actuator to enable on-demand control and prevent added drag often associated with passive actuators when not in use. The method of tuning the actuator momentum and swirl independently and simultaneously from a single orifice has not existed in art until now. In a certain embodiment, the present invention achieves this control by utilizing internal vanes or fluidic arrangement of a fluid source, such as tangential injection. The use of controlled swirl allows for vortical perturbation (control input) to be added to the flow field in a manner desired to trigger vortical instability (mixing), which leads to lower actuator power required to alter the flow field for enhanced engineering benefits such as lift increase, drag reduction or enhanced mixing, thereby essentially altering the behavior of turbulent flows. Applications include but are not limited to separation control, mixing enhancement, noise reduction, and turbulence transition delay.

The method of altering fluid flow by adding momentum and wall-normal vorticity was simulated by analyzing separated flow around a canonical NACA 0012 airfoil. Two angles of attack in particular were investigated, α=6° (reattached flow) and α=9° (fully separated flow). The study was performed for an incompressible flow at a chord based Reynolds number of $Re=\rho_\infty U_\infty c/\mu=23{,}000$, using very high-fidelity large-eddy simulation. The actuator on the wing was prescribed in the simulation through velocity boundary conditions at the wall. Wall-normal velocity and vorticity were introduced near the time-averaged separation point on the airfoil. In the results section, the effectiveness of delaying stall at moderate angles of attack with steady blowing and swirling component (wall-normal vorticity) is discussed. The results show that fully separated flow can be mitigated when wall-normal vorticity is introduced to the flow field along with momentum injection to achieve drag reduction and lift enhancement. The results also show that varying the momentum and swirl independently can produce a wide variety of flow characteristics.

Simulation Methodology

Figure 2:
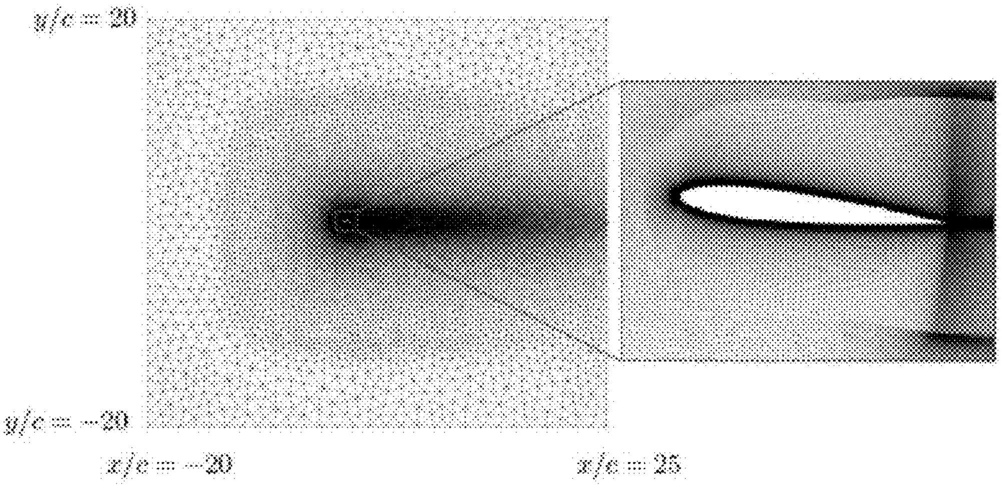
FIG. 2 represents the spatial discretization for the baseline case at an angle of attack of $\alpha=6°$.

The numerical simulation of three-dimensional flow over a NACA 0012 airfoil was performed with an incompressible finite-volume flow solver, Cliff (CharLES), developed by Cascade Technologies [28], [30]. All variables reported herein are non-dimensional. The characteristic scales used for the non-dimensionalization were the freestream velocity ($U_\infty$), chord (c), and dynamic pressure ($0.5\ \rho U_\infty^2$). A Large-eddy simulation with the Vreman model was used to simulate the flow [31], [32]. The solver is second-order accurate in time and space. The solver is capable of handling structured and unstructured grids with energy conservation properties [33]. The present study utilized a hybrid structured/unstructured spatial discretization. The near-field grid was structured while the far-field grid was unstructured, for the purpose of reducing the number of cells in the computation. FIG. 2 represents the spatial discretization for the baseline case at an angle of attack of α=6°. To accommodate the controlled cases the mesh was further refined in the vicinity of the actuators in order to resolve the flow interacting with flow control input. All cases were run on the refined grid. Across the actuator model, approximately 20 points were used to resolve the boundary velocity. Details of the control setup are discussed in the Control Setup Section.

The computational domain was of size (x/c; y/c; z/c)∈[−20, 25]×[−20, 20]×[−0.1, 0.1]. The no-slip boundary condition was applied on the airfoil surface. A velocity profile, to be discussed later, was specified at the actuator locations. At the inlet, a uniform flow of $u/U_\infty=(1, 0, 0)$ was prescribed and symmetry boundary conditions were used for the far-field (top and bottom). A convective outflow condition was used at the outlet to allow wake structures to leave the domain without disturbing the near-field solution.

A. Validation

Figure 3:
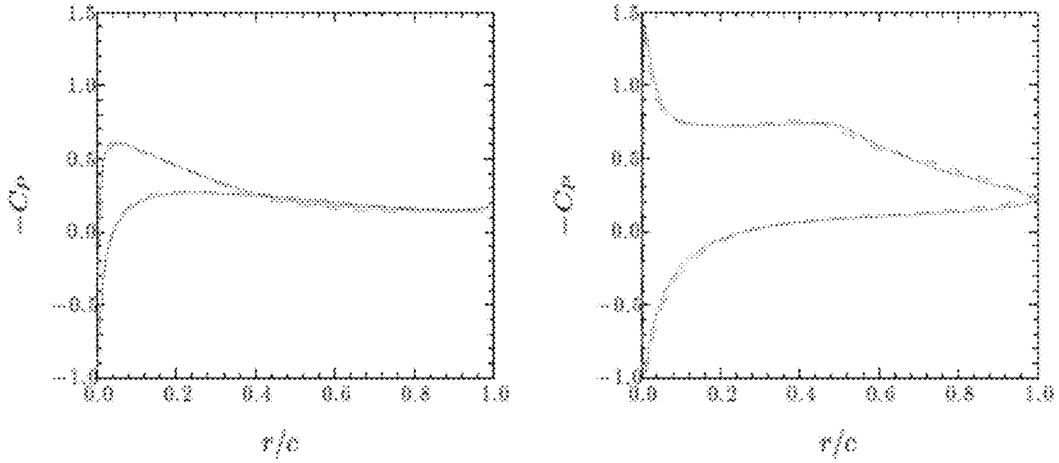
FIG. 3 provides plots for the coefficient of pressure on the suction and pressure surfaces of the airfoil for cases of $\alpha=3°$ (left) and $\alpha=9°$ (right). In both graphs, the dashed line represents the results by Kojima et al. [34] and the current results are shown with a solid line.

The computational setup was validated against the numerical study at Re=23,000, and an angle of attack of α=3°, 6°, and 9°, of flow over a NACA0012 airfoil conducted by Kojima et al. [34]. The flow field, the lift and drag forces, and the surface pressure distribution from the present study were found to be in agreement with those from Kojima et al. The force and pressure coefficients are defined as $$C_L \equiv \frac{F_L}{\frac{1}{2}A\rho_\infty U_\infty^2},\ C_D \equiv \frac{F_D}{\frac{1}{2}A\rho_\infty U_\infty^2},\ C_P \equiv \frac{p-p_\infty}{\frac{1}{2}\rho_\infty U_\infty^2}, \tag{1}$$

where A is the airfoil planform area. The time-averaged coefficient of pressure for α=3° and 9° can be seen in FIG. 3, exhibiting good agreement with the computational work by Kojima et al. FIG. 3 provides graphs of the coefficient of pressure on the suction and pressure surfaces of the airfoil for cases of α=3° (left) and α=9° (right). In both graphs, the dashed line represents the results by Kojima et al. [34] and the current results are shown with a solid line. The comparison of lift and drag coefficients at α=3°, α=6°, and α=9° can be seen in Table 1, showing reasonable agreement for all angles of attack. With the baseline cases validated, flow control for the separated flow cases of α=6° and 9° was implemented.

TABLE 1

Lift and drag coefficients of the NACA0012 airfoil for the baseline cases.

| | Kojima et al.[34] | | Present | |
|---|---|---|---|---|
| α | $C_L$ | $C_D$ | $C_L$ | $C_D$ |
| 3° | 0.086 | 0.036 | 0.096 | 0.036 |
| 6° | 0.639 | 0.054 | 0.637 | 0.062 |
| 9° | 0.594 | 0.118 | 0.565 | 0.117 |

Control Setup

Figure 4A:
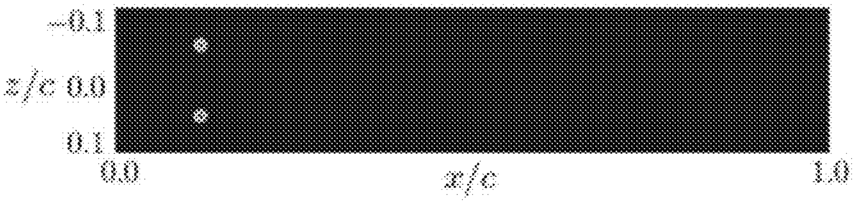
FIG. 4A is a suction-side surface of the airfoil.
Figure 4B:
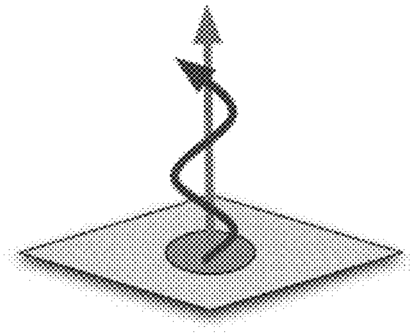
FIG. 4B depicts an illustrative blowing velocity vector and a vorticity vector injection from an actuator.

The actuator input was introduced through a boundary condition on the surface of the airfoil. The setup included two circular holes with radii of $r_0/c=0.01$ located on the top surface of the airfoil as shown in FIG. 4A. These actuators were positioned at the 10% chord location (close to the natural separation point) and were placed w/c=0.1 apart in the spanwise direction. FIG. 4B provides an exemplary illustration of the wall-normal vorticity and momentum injections seen at each input.

Figure 5:
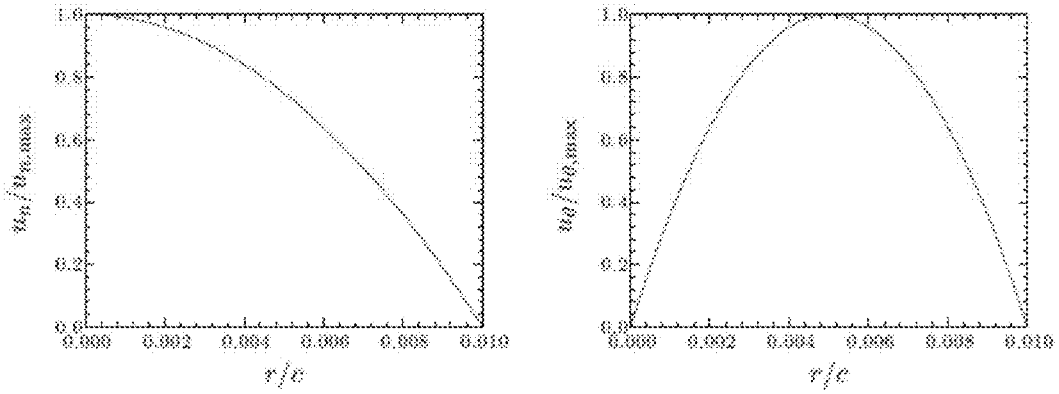
FIG. 5 provides plots of the velocity profiles used for the actuator boundary conditions for wall-normal velocity, $u_n$, (momentum injection; left) and azimuthal/swirling velocity, $u_\theta$, (vorticity injection; right).

The primary goal of this study was to assess the influence of momentum and vorticity injection. At the actuator locations, the wall-normal and azimuthal actuator velocity profiles were prescribed. The normal velocity component controls the amount of momentum injection and the azimuthal component determines the amount of wall-normal vorticity ($\omega_n$) added to the flow. It should be noted that there was an inherent azimuthal component of vorticity ($\omega_\theta$) that was also injected by the gradient of the normal actuator jet velocity. The equations used for the time-invariant velocity profiles are $$u_n / u_{n,max} = 1 - \left(\frac{r}{r_0}\right)^2, \tag{2}$$

$$u_\theta / u_{\theta,max} = 4\left(1 - \frac{r}{r_0}\right)\frac{r}{r_0} \tag{3}$$

which are shown in FIG. 5. The maximum velocities used for this study can be found in Tables 2 and 3. FIG. 5 provides the velocity profiles used for the actuator boundary conditions for wall-normal velocity, $u_n$, (momentum injection; left graph) and azimuthal/swirling velocity, $u_\theta$, (vorticity injection; right graph).

The amount of momentum injected for flow control is reported in terms of the momentum coefficient, defined by $$C_\mu = \frac{\rho_n u_n^2 \pi r_0^2}{\frac{1}{2}\rho_\infty U_\infty^2 A}, \tag{4}$$

where the subscripts denote the freestream (∞) and the normal (n) values. The momentum coefficient quantifies the ratio between the momentum input by the actuator to the momentum of the freestream. The values chosen for this study are of O (0.1%-1%), which is of similar magnitude used by previous studies for control over symmetric airfoils [35], [38].

A coefficient to quantify the rotation input to the flow was also required. Based on the vortical (circulation) input from the actuator, the lateral momentum flux as $\rho r_0 u_\theta \Gamma$ can be quantified [27]. For the velocity profiles specified, the wall-normal circulation (strength of wall-normal swirl) input is $$\Gamma_n = \int\int_S \omega \cdot dS = \frac{8\pi r_0}{3} u_{\theta,max}(1 - r_0), \tag{5}$$

for a single actuator. The lateral momentum added to the flow by the freestream momentum was normalized, which is referred to as the swirl coefficient $$C_{swirl} = \frac{\rho_j r_0 u_\theta \Gamma_n}{\frac{1}{2}\rho_\infty U_\infty^2 A}. \tag{6}$$

The swirl coefficient utilized in the present study was of O (1%), which is on the same order as the values of the momentum coefficient.

Figure 6:
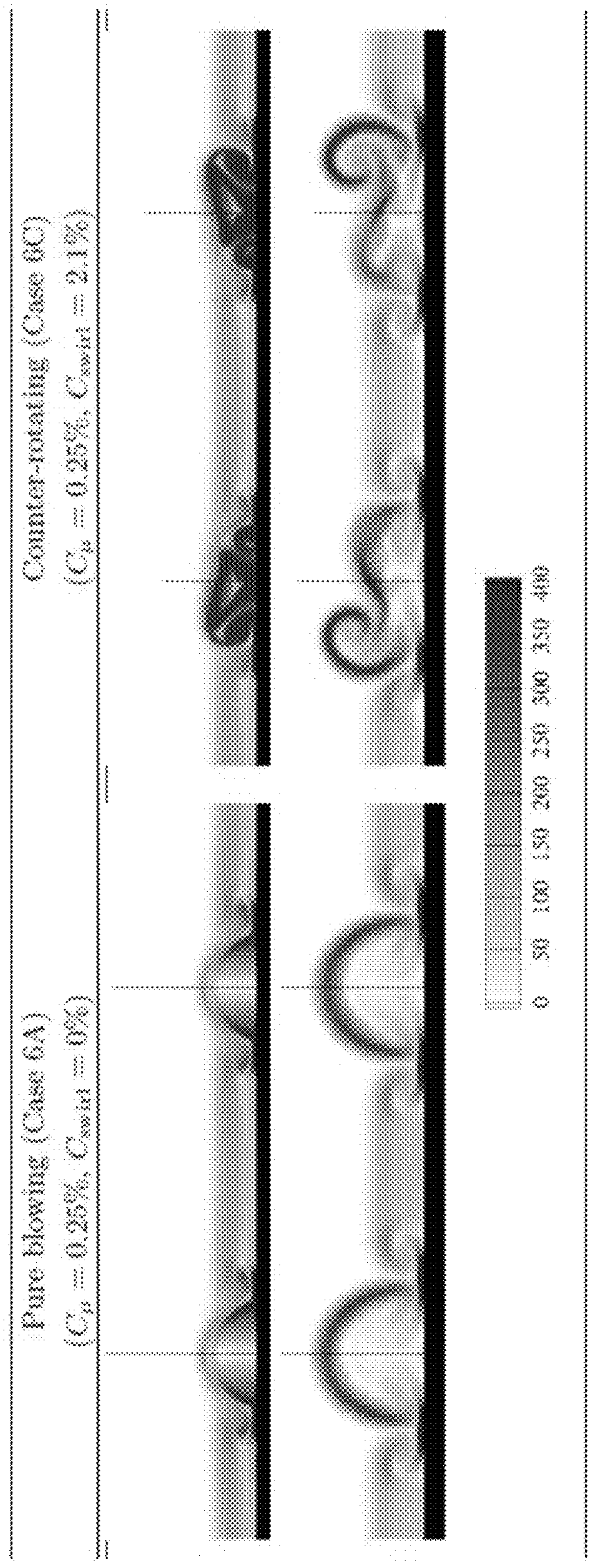
FIG. 6 shows the vorticity magnitude ($0\leq\|\omega\|\leq400$) downstream of pure blowing and counter-rotating actuator. The distance from the center of the actuator is x/c=0.1 (top) and 0.14 (bottom).

FIG. 6 shows the magnitude of vorticity (||ω||) in the vicinity of the actuator for α=6°. The effect of the streamwise velocity can be seen interacting with the wall-normal jet. At the centerline location of the pure blowing jet, x/c=0.1, the flow is symmetric and remains symmetric just downstream of the actuator at x/c=0.14. For the jet with rotation added (counter-rotating pair of jets shown here) mixing is increased due to the addition of wall normal vorticity. The counter-rotating pair of jets means that one jet is rotating in a direction opposite to the other jet. The following section highlights the following setups to illustrate the effects of each of the control inputs:

- baseline: no control performed ($C_\mu$=0, $C_{swirl}$=0)
- pure blowing: pure blowing only ($C_\mu$>0, $C_{swirl}$=0)
- co-rotating: pair of jets with co-rotating swirl added ($C_\mu$>0, $C_{swirl}$>0)
- counter-rotating: pair jets with counter-rotating swirl added ($C_\mu$>0, $C_{swirl}$>0)

Results

The effects of momentum and vorticity injections on suppressing separation around an airfoil for reattached (α=6°) and fully separated (α=9°) flows were examined. For all results presented, the force directly induced by the actuator is included in the reported force values.

A. Case of α=6°

Figure 7:
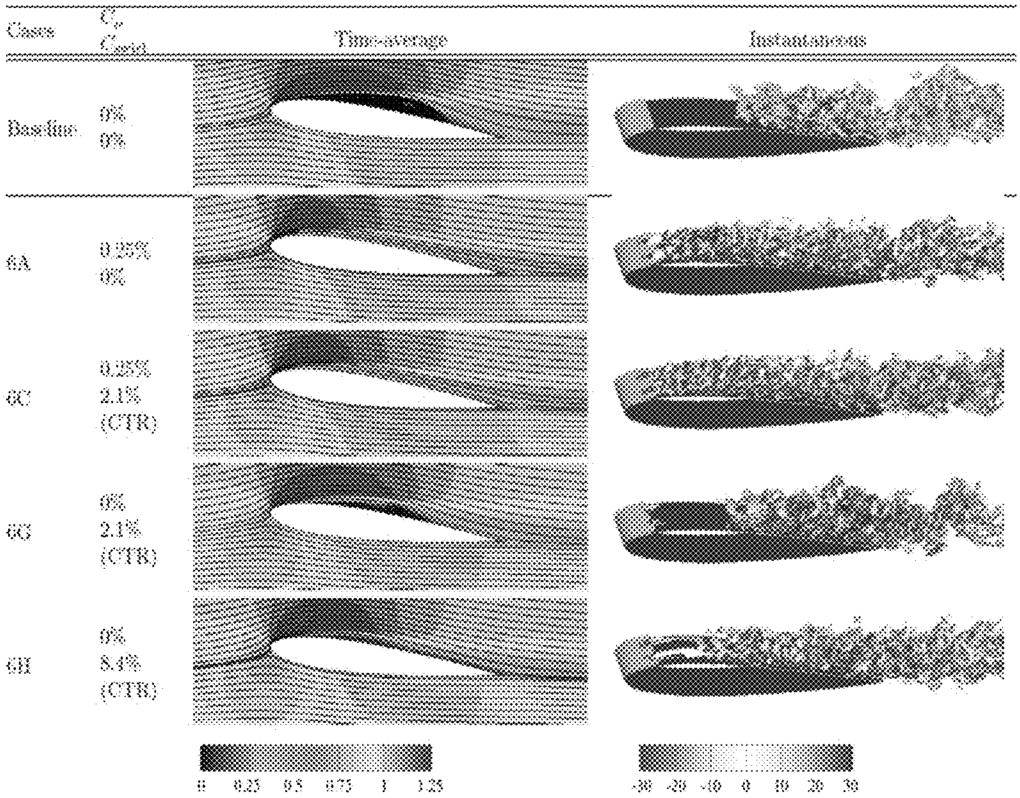
FIG. 7 is a table showing flowfields for representative cases at $\alpha=6°$. Time-average figures show streamlines and u-velocity. The instantaneous figures show Q-criterion colored with $-30<\omega_x<30$.

For the uncontrolled flow, the time-averaged flow separation bubble appears over the mid-chord section of the airfoil at α=6°. The flow separates near, x/c=0.1 and reattaches around, x/c=0.7 as shown by the time-averaged streamlines in FIG. 7. Spanwise vortices are generated due to the roll up of the shear layer. In a time-averaged sense, the reattachment occurs near the location where the vortices (gray structures) break up as shown in FIG. 7. The corresponding time-averaged lift and drag forces are shown in Table 1 and are later compared to the controlled cases. Whether it is possible to break up the prominent vortices further upstream to reattach the flow or completely remove separation is also examined.

TABLE 2

Parameter settings considered for separation control of NACA0012 at α = 6°. For the rotational direction listed in the last column. COR and CTR denote co-rotating and counter-rotating jets, respectively.

| | | Momentum injection | | Vorticity injection | | |
|---|---|---|---|---|---|---|
| α | Case | $C_\mu$ [%] | $u_{n,max}/U_\infty$ | $C_{swirl}$ [%] | $u_{\theta,max}/U_\infty$ | Rot. dir. |
| 6° | 6A | 0.25 | 1.261 | 0 | 0 | — |
| | 6B | 0.25 | 1.261 | 2.09 | 1.26 | COR |
| | 6C | 0.25 | 1.261 | 2.09 | 1.26 | CTR |
| | 6D | 0.0625 | 0.631 | 0 | 0 | — |
| | 6E | 0.0625 | 0.631 | 2.09 | 1.26 | COR |
| | 6F | 0.0625 | 0.631 | 2.09 | 1.26 | CTR |
| | 6G | 0 | 0 | 2.09 | 1.26 | CTR |
| | 6H | 0 | 0 | 8.37 | 5.04 | CTR |

Next, the application of flow control with input parameters $C_\mu$=0% to 0.25% and $C_{swirl}$=0% to 8.4%, at α=6° is consider. The maximum normal and azimuthal velocities used for these cases are in Table 2. For the majority of cases, the injection of wall-normal momentum ($C_\mu$=0.0625% and 0.25%) near the separation point reattaches the flow as shown by cases 6A and 6C in FIG. 7. The drag and lift coefficients for different flow control cases are summarized in FIG. 8. Although all cases considered reduce drag on the airfoil, they are accompanied by a decreased lift force, except for case 6G. Once the separation is removed, the level of drag reduction appears to be saturated, which is observed by looking at the pure blowing cases, see for example 6A=0.25%) and 6D (0.0625%). For cases with $C_\mu$=0.25% (6A-6C), it is interesting to note that forces on the airfoil are nearly equal even when rotation is added. This suggests that the flow control effect is saturated with this level of momentum injection. Decreasing the momentum coefficient to $C_\mu$=0.0625% (cases 6D-6F) illustrates that there is a larger deviation in the forces measurements with and without added vorticity. For most of the cases, the blowing component overwhelms the flow, reattaches the boundary layer, and removes the separated flow region. The addition of wall-normal vorticity has little effect on the flow, for the present α=6° cases. The results agree with previous works with respect to the momentum coefficient necessary to reattach the flow over a canonical airfoil [35], [38].

Figure 8:
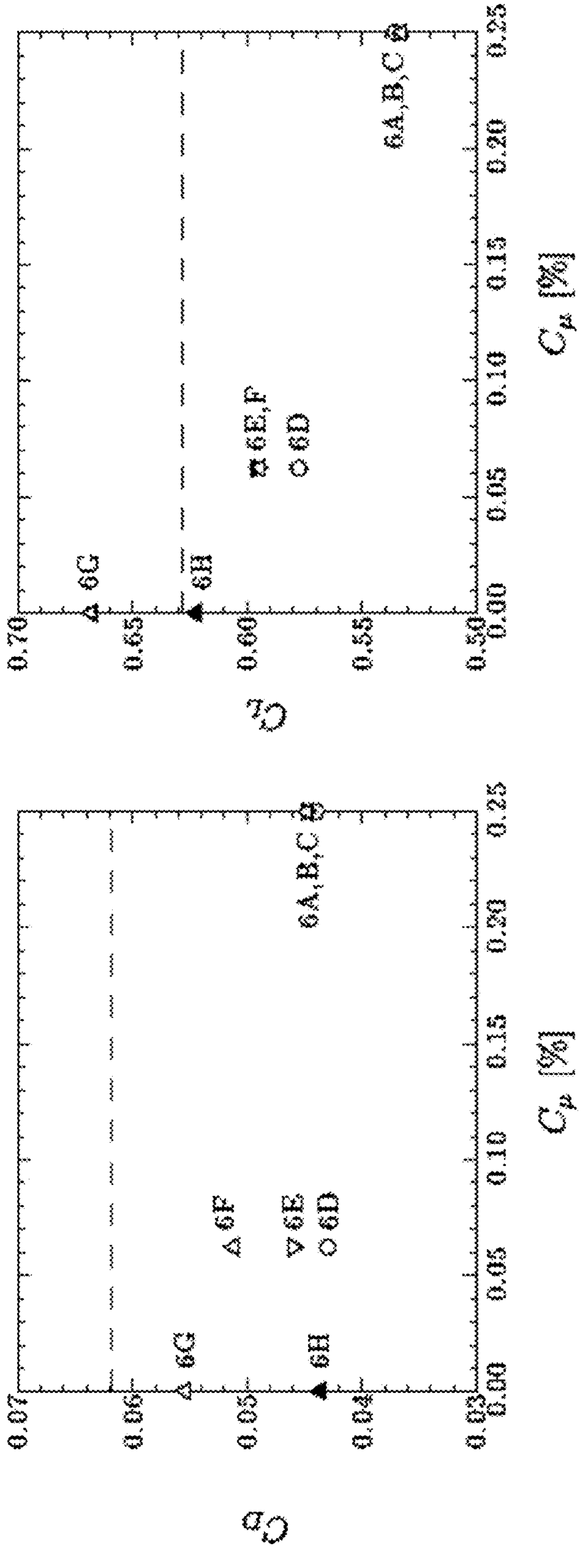
FIG. 8 provides plots of the coefficients of drag (left) and lift (right) for $\alpha=6°$. The baseline value is shown by the dashed line and the controlled cases are pure blowing, O, co-rotating, ∇, and counter-rotating, Δ. For the cases with swirl added the values correspond to the white and black triangles, for $C_{swirl}=2.1\%$ and $C_{swirl}=8.4\%$, respectively.

Decreasing the coefficient of momentum to $C_\mu \to 0$ (6G and 6H) shows that the flow can be effected without any momentum injection if $C_{swirl}>0$. The pure rotational cases (6G and 6H) on the far left of FIG. 8, show the effect on lift and drag. FIG. 7 shows these two different cases (6G and 6H) with no blowing, and one with four times the swirl coefficient of the other ($C_{swirl}$=2.1% and 8.4%). Both coefficients of swirl ($C_{swirl}$=2.1% and 8.4) do not reattach the flow, but reduce the size of the separated flow region. The larger coefficient of swirl reduces the size of the separation region the most. Therefore, it would appear that continuing to increase the coefficient of swirl would result in the flow eventually remaining attached over the entire airfoil. For lift enhancement, the addition of wall-normal vorticity to the flow appears to be important (see case 6G). While, for this case, the level of drag reduction is not as high as cases 6A-C, both drag reduction and lift enhancement were achieved. The separation is not completely eliminated for case 6G, but provides favorable changes in aerodynamic performance.

Figure 9A:
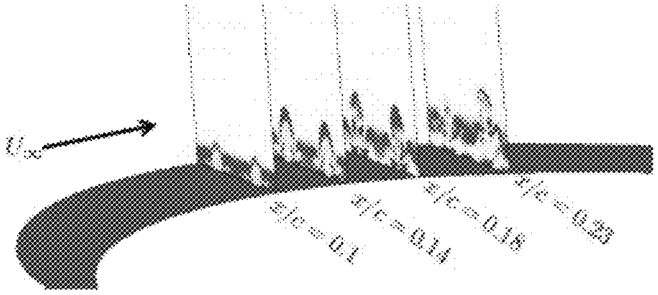
FIG. 9A is a perspective view of slices of the streamwise vorticity development downstream for the blowing case.
Figure 9B:
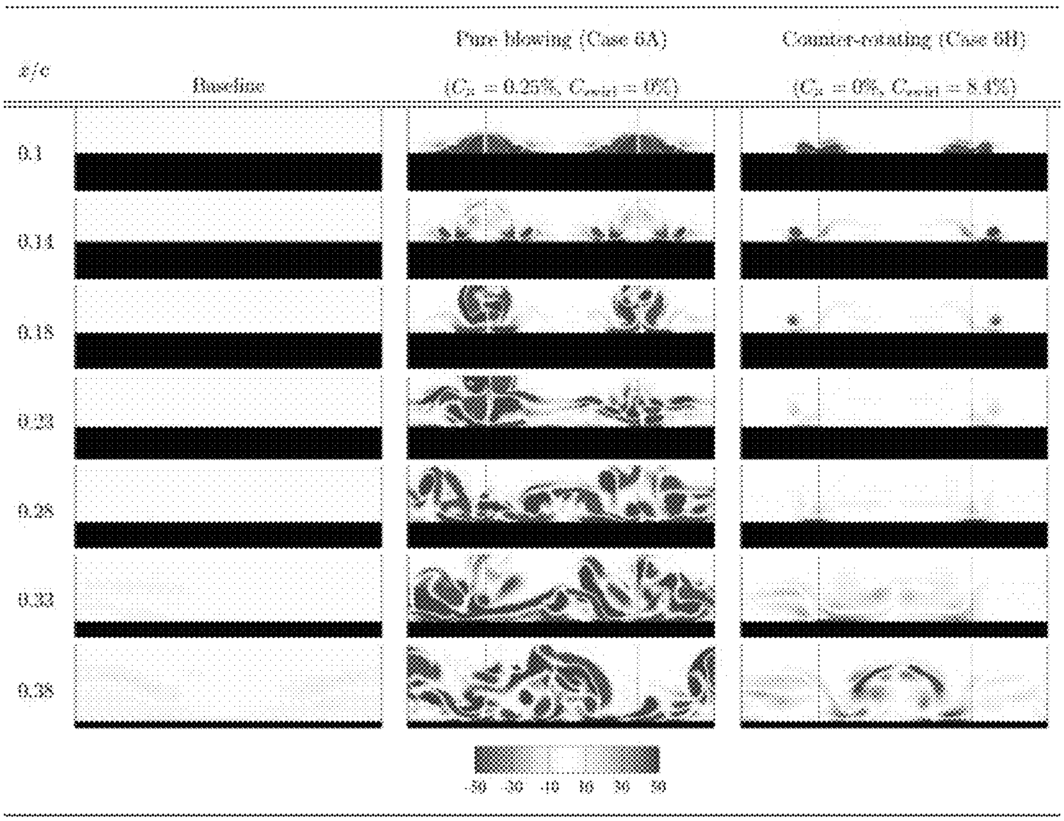
FIG. 9B provides slices of the streamwise vorticity ($-50\leq\omega_x\leq50$) development downstream for baseline, blowing, and counter-rotating actuator. The slices of the airfoil at $\alpha=6°$ spans z/c=0.2.

To further investigate the effect of the injection of wall-normal vorticity, slices were taken in the streamwise direction to visualize the streamwise vorticity as exemplified in FIG. 9A. Illustrated by the downstream slices in FIG. 9, the streamwise vortices mix the freestream momentum with the low momentum boundary layer. For the baseline case, the flow is separated throughout all of the images in FIG. 9, and therefore there is very little streamwise vorticity. Near the actuator (x/c=0.1 and 0.14), in controlled flow, pure momentum injection (case 6A) creates a large amount of streamwise vorticity compared to the case with pure rotation (6H). Further downstream (x/c=0.18 and 0.38), the streamwise vorticity remains prevalent for case 6A, and forces the high-momentum free-stream into the low-momentum boundary layer. In case 6H, the streamwise vorticity generated by the actuator diffuses through x/c≈0.23, and then there is an increase in the streamwise vorticity. The increase in streamwise vorticity is greater than that of the baseline case, which correlates to the shift of the reattachment point further upstream. Case 6H has a smaller recirculation region than the baseline case.

Figure 10:
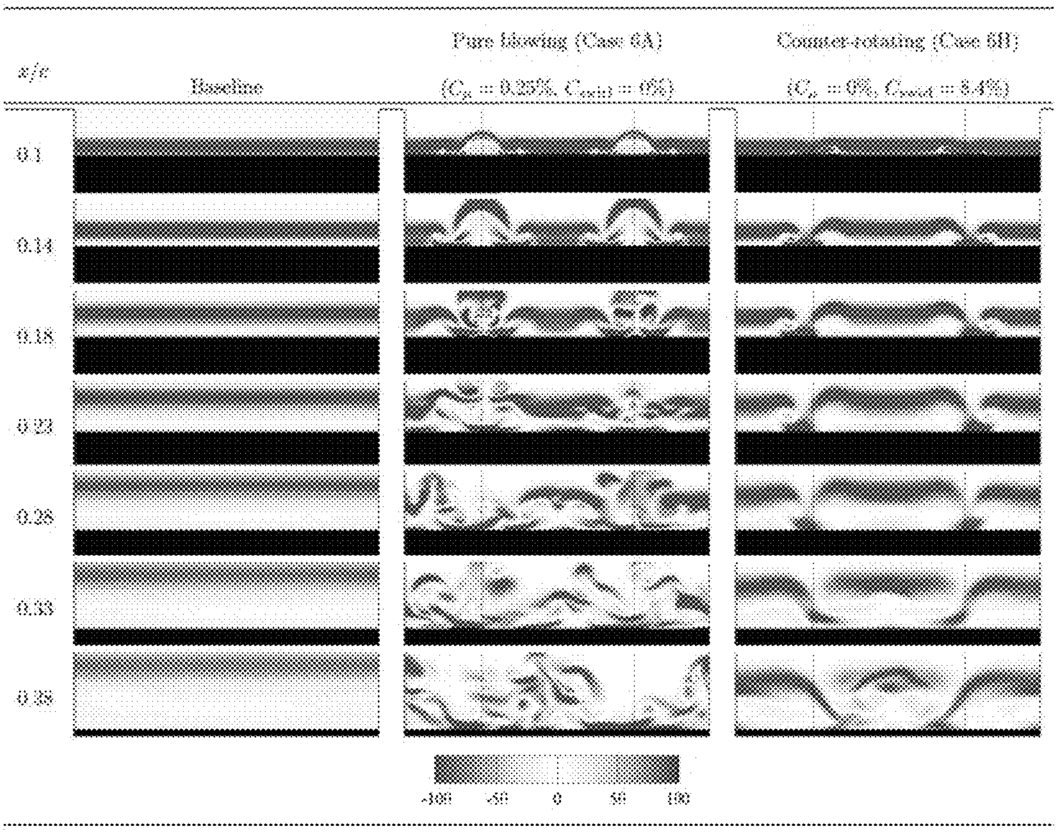
FIG. 10 provides slices of the spanwise vorticity ($-100\leq\omega_z\leq100$) development downstream for three different cases: baseline, blowing, and counter-rotating actuator. The width of the planar slices of the airfoil at $\alpha=6°$ spans z/c=0.2.

The downstream evolution of the spanwise vorticity profile is seen in FIG. 10. The baseline case shows little variation in the shear layer profile, besides spreading and increasing its distance from the surface due to laminar separation. The pure blowing (case 6A) and counter-rotating (case 6H) flow control cases show the interaction of the shear layer and the actuator input. Case 6A exhibits the control input inducing strong mixing in the boundary layer. The momentum injection disrupts the shear layer and generates streamwise vortices that dismantle the well-defined shear layer. While case 6H shows the interaction between the pure swirling input and the shear layer, the interaction is notably less than that of the case 6A. For case 6H, the smaller disturbance in the shear layer propagates in the spanwise direction slower, leaving the shear layer intact further downstream. Towards x/c=0.33 and 0.38, the disturbance begins to deform the shear layer, leading to reattachment just downstream (x/c≈0.4).

B. Case of α=9°

Figure 11:
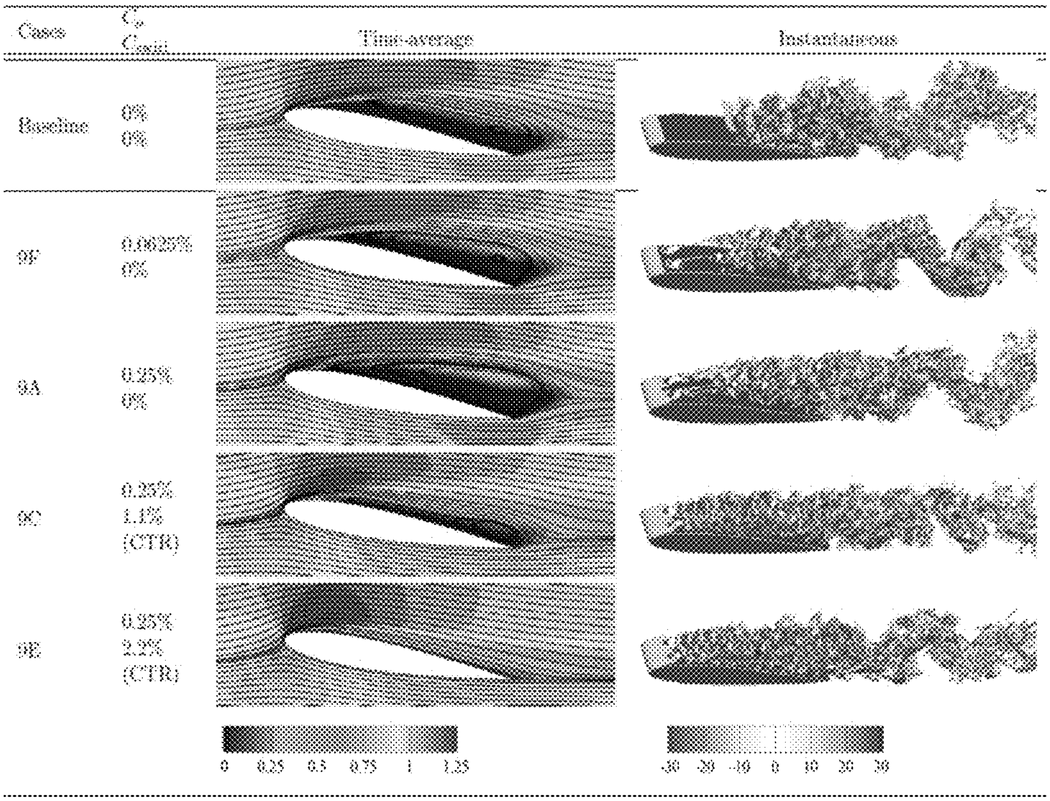
FIG. 11 is a table showing flowfields for multiple different cases at $\alpha=9°$. Time-average figures show streamlines and u-velocity. The instantaneous figures show Q-criterion colored with $-30<\omega_x<30$.

At an angle of attack of α=9°, the uncontrolled flow is fully separated over the entire length of the airfoil as shown in FIG. 11. The size of the recirculation region is larger compared to the flow for α=6°, resulting in the increase in drag and decrease in lift. To reattach this flow, we consider the use of momentum injection with $C_{swirl}$=0% to 0.25%, and vorticity injection with $C_{swirl}$=0% to 8.4%. The values for the actuator input used for the α=9° actuation cases can be seen in Table 3. We show below that larger amounts of momentum and vorticity injections are required to reattach the flow at this angle of attack compared to the case of α=6°.

TABLE 3

Parameter settings considered for separation control of NACA0012 at α = 9°. For the rotational direction listed in the last column. COR and CTR denote co-rotating and counter-rotating jets, respectively.

| | | Momentum injection | | Vorticity injection | | |
|---|---|---|---|---|---|---|
| α | Case | $C_\mu$ [%] | $u_{n,max}/U_\infty$ | $C_{swirl}$ [%] | $u_{\theta,max}/U_\infty$ | Rot. dir. |
| 9° | 9A | 0.25 | 1.261 | 0 | 0 | — |
| | 9B | 0.25 | 1.261 | 1.046 | 0.63 | COR |
| | 9C | 0.25 | 1.261 | 1.046 | 0.63 | CTR |
| | 9D | 0.25 | 1.261 | 2.09 | 1.26 | COR |
| | 9E | 0.25 | 1.261 | 2.09 | 1.26 | CTR |
| | 9F | 0.0625 | 0.631 | 0 | 0 | — |
| | 9G | 0.0625 | 0.631 | 2.09 | 1.26 | COR |
| | 9H | 0.0625 | 0.631 | 2.09 | 1.26 | CTR |
| | 9I | 0 | 0 | 8.37 | 5.04 | CTR |

With pure blowing using $C_\mu$=0.0625% (case 9F) and 0.25% (case 9A), spanwise vortices are broken down further upstream as illustrated in FIG. 11. Even though it appears that the spanwise vortices can become re-oriented as streamwise vortices, the flow control input is not sufficient to fully reattach the flow. The higher momentum coefficient (pure blowing) has more effect on the flow, but does not positively alter the lift and drag forces on the airfoil. In fact, sole addition of momentum in a naive manner only enlarges the recirculation zone depicted in FIG. 11.

Figure 12:
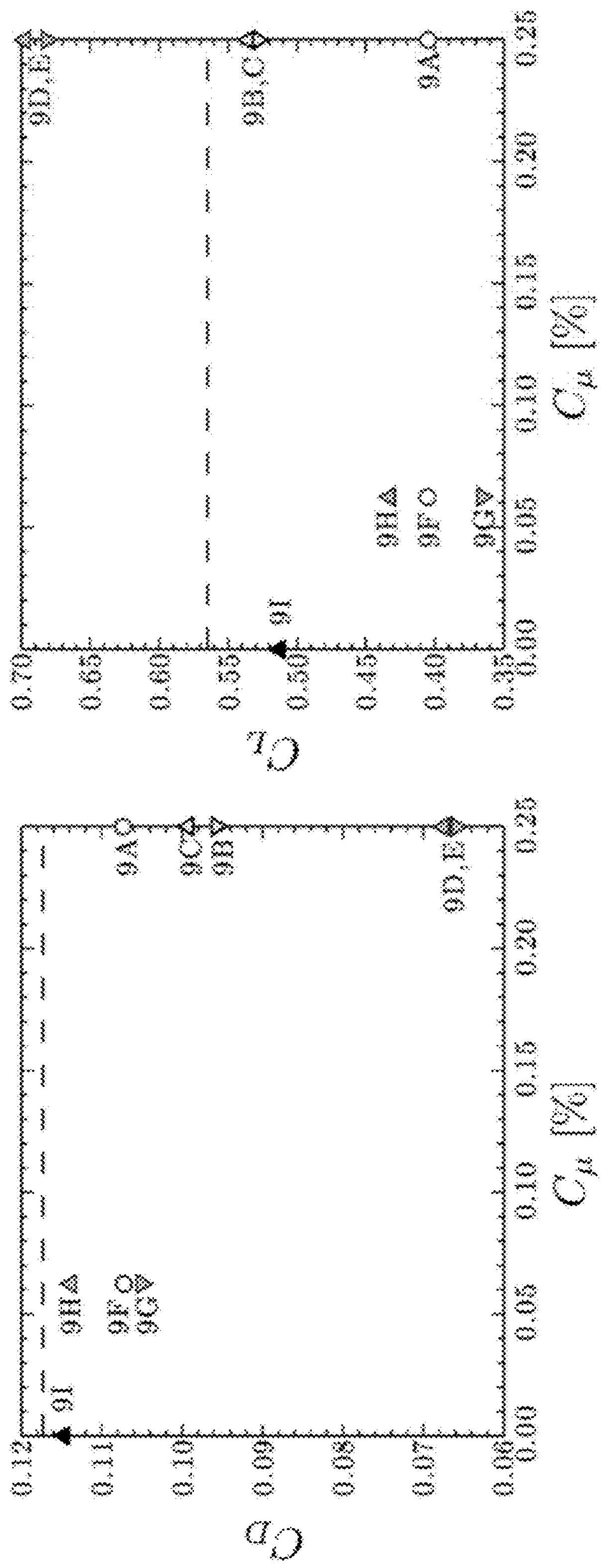
FIG. 12 provides plots of the coefficients of drag (left) and lift (right) forces for $\alpha=9°$. The baseline value is shown by the dashed line and the controlled cases are pure blowing, O, co-rotating, ∇, and counter-rotating, Δ. For the cases with swirl added, the coefficient of swirl values correspond to the white triangles, the grey triangles, and the black triangles, for $C_{swirl}=1.0\%$, $C_{swirl}=2.1\%$, and $C_{swirl}=8.4\%$, respectively.

According to FIG. 12, the majority of the flow control strategies considered for cases at the higher angle of attack reduces both drag and lift forces. The only two cases that achieve drag reduction and lift enhancement are the cases with the largest momentum input with the greatest amount of wall-normal vorticity added, cases 9D and E ($C_\mu$=0.25%, $C_{swirl}$=2.1%). Previous studies have shown that pure momentum injection is an effective way to reattach the flow. Therefore, increasing $C_\mu$ past 0.25%, in all likelihood, will eventually completely reattach the flow.

For cases with swirl added, cases 9C and E, the breakup of the shear layer into smaller scales occurs further upstream as visualized in FIG. 11. Additionally, the small structures are spread in the spanwise direction. The breakup of the vortices and enhanced mixing leads to reattachment of the flow for case 9E. The increase in rotation for the same value enables the flow to gradually reattach as shown by the progression from case 9A, 9C to 9E. As shown in FIG. 12, increasing the rotational component for a constant $C_\mu$=0.25% increases lift and decreases drag. The flow becomes fully attached for cases 9D and 9E, which corresponds to the only two cases in the present study for α=9°, with decreased drag and increased lift. There is only slight difference in the force values between co-rotating (9D) and counter-rotating cases (9E), but the primary dependence appears to be on the amount of momentum and vorticity injected.

Figure 13:
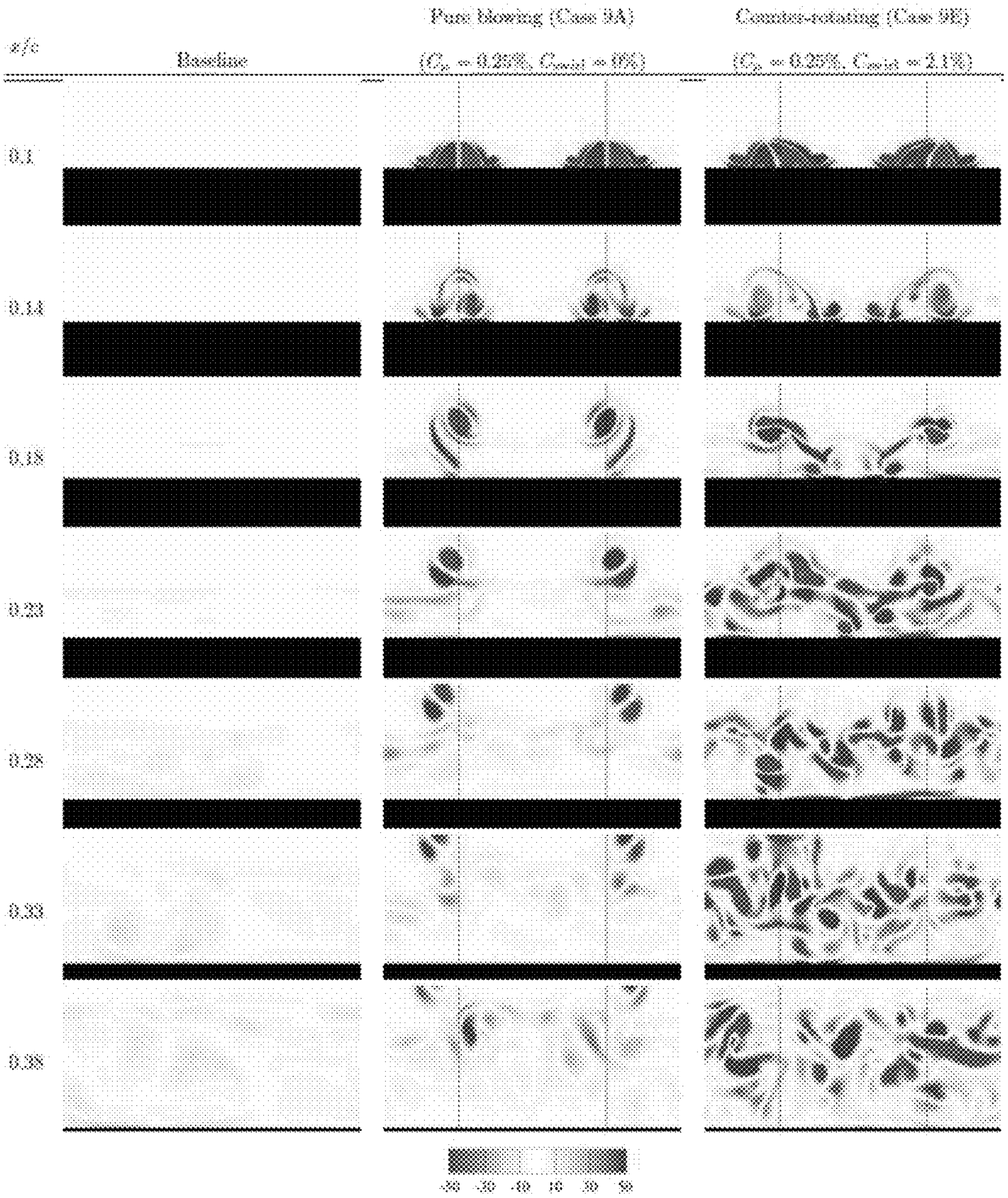
FIG. 13 provides slices of the streamwise vorticity ($-50\leq\omega_x\leq50$) development downstream for the baseline, blowing, and counter-rotating actuator. The planar slices of the airfoil at $\alpha=9°$ have a span of z/c=0.2.

Visualizing the streamwise and spanwise vorticity downstream of the actuator location offers additional insight into how flow control alters the fully separated flow. The streamwise vorticity profiles are observed in FIG. 13, and the baseline case has very little streamwise vorticity. Pure blowing (case 9A, $C_\mu$=0.25%) produces a large amount of streamwise vorticity directly through injection and by re-orienting the spanwise vortices. For case 9A, the injected vorticity input lifts off the airfoil without the strong interaction between the freestream and the boundary layer. When rotation is added (FIG. 12, case 9E, $C_{swirl}$=2.1%) to the actuation input, it is observed that the streamwise vortices remain closer to the surface of the airfoil and mixing in the spanwise direction is enhanced. This allows the freestream and boundary layer to interact and the flow to become reattached. The co-rotating and counter-rotating cases with these momentum and vorticity inputs are the only cases that become attached and the forces are drastically improved.

Figure 14:
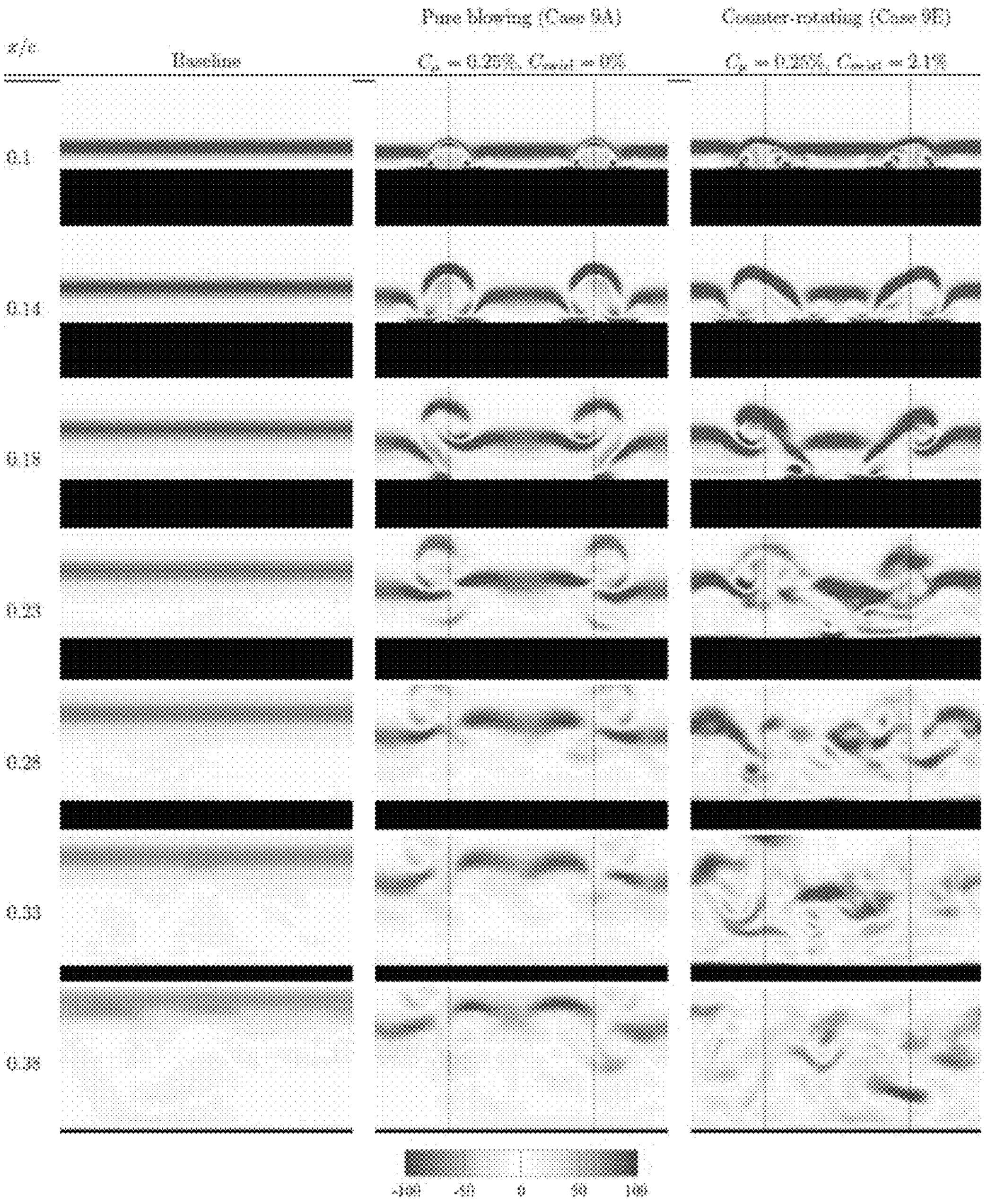
FIG. 14 provides slices of the streamwise vorticity ($-100\leq\omega_z\leq=100$) development downstream for the baseline, blowing, and counter-rotating actuator. The planar slices of the airfoil at $\alpha=9°$ have a span of z/c=0.2.

Similar to the $\alpha$=6° case, the baseline spanwise vorticity profile does not vary greatly moving down-stream, as shown in FIG. 14. Case 9A does not exhibit strong interaction of the actuator input with the shear layer to suppress separation. At the jet location, there is a large disturbance in the shear layer and spanwise vorticity is created. Further downstream of the actuator location, the flow appears to relax to the original uncontrolled profile (x/c≈0.33, case 9A). For case 9E, the addition of wall-normal vorticity spreads the streamwise vorticity created by the momentum injection and interacts more strongly with the shear layer than the pure blowing case. This allows for a stronger interaction between the boundary layer and freestream, allowing high momentum fluid to flow into the recirculation zone to yield fully attached flow. At the spanwise slice x/c=0.38 in FIG. 14 (bottom), the baseline and case 9A exhibit a well-defined shear layer, while the flow control with counter-rotating case 9E destroys the laminar shear layer.

SUMMARY

The present computational study examined the influence of momentum and wall-normal vorticity injection on separated flow over a NACA0012 airfoil at $\alpha$=6° and 9° and Re=23,000. These actuator inputs were specified through velocity boundary conditions in the LES calculations near the natural separation points. At $\alpha$=6°, the baseline flow separates at x/c≈0.1 and then reattaches further downstream. The time-averaged recirculation region is eliminated for these cases in which momentum injection ($C_\mu$=0.0625% and 0.25%) is introduced. By eliminating the separated flow, the drag decreases by approximately 30%. The wall-normal vorticity injection enables the flow to provide enhanced lift while achieving drag reduction.

Flow control for the fully separated flow at $\alpha$=9° was also considered. To suppress separation at this higher angle of attack, a combination of momentum and vorticity injections were required. Drag reduction was achieved for all of the cases considered, but the flow remained separated resulting in lift decrease for the majority of cases. It was found that for a momentum coefficient of $C_\mu$=0.25%, increasing the swirl of the jet (wall-normal vorticity) decreases the size of the recirculation region. Two cases in particular, co-rotating (Case 9F) and counter-rotating (9E), $C_\mu$=0.25%, $C_{swirl}$=2.1%, added sufficient wall-normal vorticity to momentum injection to fully reattach the flow. The reattached flow achieved noticeable drag reduction and lift enhancement.

The change in the flow field through flow control was examined by visualizing the spanwise and streamwise vorticity profiles. It was found that the addition of momentum creates perturbation to the shear layer and the superposition of the wall-normal vorticity allowed for additional mixing to the separated flow. Successful flow control setups exhibited effective breakup of the laminar shear layer by redirecting the spanwise vortex sheet into streamwise vortices that enabled the freestream momentum to be pulled closer to the airfoil surface and thereby suppressing stall.

The present invention can also be implemented around other body shapes with the purpose of energizing the near surface flow or enhancing flow mixing. Direct applications of this technology exist for drag reduction, lift enhancement, mixing enhancement, and noise control. The invention can be used in various transportation vehicles including cars, aircraft, and watercraft. Other applications may include engines and power generation devices.

GLOSSARY OF CLAIM TERMS

Active Flow Control: manipulating the fluid flow by adding energy to the flow (as opposed to passive flow control that uses no energy input).

Active input: control input that is added actively (for example: jet momentum and swirl/vorticity in the patent)

Momentum: is a quantity defined as the product of density and velocity, which is related to the inertial force on a fluid.

Vorticity: is a rotational component of the velocity gradient field, defined as the curl of velocity.

REFERENCES

Phillip M. Munday and Kunihiko Taira. "Separation control on NACA 0012 airfoil using momentum and wall-normal vorticity injection." 32nd AIAA Applied Aerodynamics Conference 2014.

[1] Gad-el Hak, M. and Bushnell, D. M., "Separation rontrol: review," Journal of Fluids Engineering, Vol. 113, No. 5, March 1991.

[2] Greenblatt, D. and Wygnanski, I., "The control of flow separation by periodic excitation," Prog. Aero. Sci., Vol. 36, 2000, pp. 487-545.

[3] Lachmann, G. V., Boundary layer and flow control. Its principles and applications. vol 1 & 2, Pergamon Press, 1961.

[4] Schlichting, H., Boundary layer theory, New York: Mcgraw-Hill, 1979.

[5] Cattafesta, L., Song, Q., Williams, D., Rowley, C., and Alvi, F., "Active control of flow-induced cavity oscillations," Progress In Aerospace Sciences, Vol. 44, 2008, pp. 479-502.

[6] Cattafesta, L. N. and Sheplak, M., "Actuators for active flow control," Annu. Rev. Fluid Mech., Vol. 43, 2011, pp. 247-272.

[7] Gad-el-Hak, M., Flow control: passive, active, and reactive flow management, Cambridge Univ. Press, London, 2000.

[8] Joslin, R. D. and Miller, D., editors, Fundamentals and applications of modern flow control, Progress in Astronautics and Aeronautics, AIAA, 2009.

[9] Wu, J.-Z., Lu, X.-Y., Denny, A. D., Fan, M., and Wu, J.-M., "Post-stall flow control on an airfoil by local unsteady forcing," J. Fluid Mech., Vol. 371, 1998, pp. 21-58.

[10] Glezer, A. and Amitay, M., "Synthetic jets," Annu. Rev. Fluid Mech., Vol. 34, 2002, pp. 503-529.

[11] Corke, T. C., Enloe, C. L., and Wilkinson, S. P., "Dielectric barrier discharge plasma actuators for flow control," Annual Review of Fluid Mechanics, Vol. 42, 2010, pp. 505-529.

[12] Compton, D. A. and Johnston, J. P., "Streamwise vortex production by pitched and skewed jets in a turbulent boundary layer," AIAA Journal, Vol. 30, 1992, pp. 640-647.

[13] Selby, G. V., Lin, J. C., and Howard, F. G., "Control of low-speed turbulent separated flow using jet vortex generators," Experiments in Fluids, Vol. 12, 1992, pp. 394-400.

[14] Zhang, X., "The evolution of co-rotating vortices in a canonical boundary laryer with inclined jets," Physics of Fluids, Vol. 15, No. 12, December 2003, pp. 3693-3702.

[15] Pedro, H. T. C. and Kobayashi, M. H., "Numerical study of stall delay on humpback whale flippers," AIAA Paper 2008-0584, 2008.

[16] Kerho, M., Hutcherson, S., Blackwelder, R. F., and H., L. R., "Vortex generators used to control laminar separation bubbles," Journal of Aircraft, Vol. 30, No. 3, May-June 1993, pp. 315-319.

[17] Lin, J. C., "Review of research on low-profile vortex generators to control boundary-layer separation," Progress in Aerospace Science, Vol. 38, 2002, pp. 389-420.

[18] Bechert, D., Bruse, M., Hage, W., and Meyer, R., "Biological surfaces and their technological application—Laboratory and Flight Experiments on Drag Reduction and Separation Control," AIAA Paper 1997-1960, 1997.

[19] Choi, H., Moin, P., and Kim, J., "Direct numerical simulation of turbulent flow over riblets," Journal of Fluid Mechanics, Vol. 255, 1993, pp. 503-539.

[20] Gaster, M., "On the generation of spatially growing waves in a boundary layer," Journal of Fluid Mechanics, Vol. 22, 1965, pp. 433-441.

[21] Liepmann, H. W., Brown, G. L., and Nosenchuck, D. M., "Control of laminar-instability waves using a new technique," Journal of Fluid Mechanics, Vol. 118, 1982, pp. 187-200.

[22] Goldstein, D., Handler, R., and Sirovich, L., "Direct numerical simulation of turbulent flow over a modelled riblet covered surface," Journal of Fluid Mechanics, Vol. 302, 1995, pp. 333-376.

[23] Kim, J., "Control of turbulent boundary layers," Journal of Fluid Mechanics, Vol. 15, No. 5, May 2003, pp. 1093-1105.

[24] Kravchenko, A. G., Haecheon, C., and Moin, P., "On the relation of near-wall streamwise vortices to wall skin friction in turbulent boundary layers," Physics of Fluids, Vol. 5, 1993, pp. 3307-3309.

[25] Schubaur, G. B. and Spangenberg, "Forced mixing boundary layers," Journal of Fluid Mechanics, Vol. 8, 1960, pp. 10-32.

[26] Liepmann, H. W. and Nosenchuck, D. M., "Active control of laminar-turbulent transition," Journal of Fluid Mechanics, Vol. 118, 1982, pp. 201-204.

[27] Shabaka, I. M. M. A., Mehta, R. D., and Bradshaw, P., "Longitudinal vortices imbedded in turbulent boundary layer. Part 1. Single vortex," Journal of Fluid Mechanics, Vol. 155, 1985, pp. 37-57.

[28] Ham, F. and Iaccarino, G., "Energy conservation in collocated discretization schemes on unstructured meshes," Annual research brief, Center for Turbulence Research, Stanford University, 2004.

[29] Ham, F., Mattson, K., and Iaccarina, G., "Accurate and stable finite volume operators for unstructured w solvers," Tech. rep., Center for Turbulence Research, 2006.

[30] Morinishi, Y., Lund, T. S., Vasilyev, O. V., and Moin, P., "Fully conservative high order finite difference schemes for incompressible flow," Journal of Computational Physics, Vol. 143, 1998, pp. 90-124.

[31] Vreman, A. W., "An eddy-viscosity subgrid-scale model for turbulent shear flow: algebraic theory and applications," Physics of Fluids, Vol. 16, 2004, pp. 3670-3681.

[32] Germano, M., Piomelli, U., Moin, P., and Cabot, W. H., "A dynamic subgrid-scale eddy viscosity model," Physics of Fluids, Vol. 3, No. 7, 1991, pp. 1760-1765.

[33] Kim, J. and Moin, P., "Application of a fractional-step method to incompressible Navier-Stokes equations," Journal of Computational Physics, Vol. 197, 1985.

[34] Kojima, R., Nonomura, T., Oyama, A., and Fujii, K., "Large-eddy simulation of low-Reynolds-number flow over thick and thin NACA airfoils," Journal of Aircraft, Vol. 50, No. 1, 2013, pp. 187-196.

[35] Seifert, A. and Pack, L. T., "Oscillatory excitation of unsteady compressible flows over airfoils at flight Reynolds numbers," No. 10.2514/6.1999-925, AIAA, 1999.

[36] Gilarranz, J. L., Traub, L. W., and Redinoitis, O. K., "A new class of synthetic jet actuators-Part II: application to flow separation control," Journal of Fluids Engineering, Vol. 127, March 2005.

[37] Deng, S., Jiang, L., and Liu, C., "DNS for flow separation control around an airfoil by pulsed jets," Computers and Fluids, Vol. 36, No. 6, 2007, pp. 1040-1060.

[38] You, D., Ham, F., and Moin, P., "Discrete conservation principles in large-eddy simulation with application to separation control over an airfoil," Physics of Fluids, Vol. 20, October 2008.

All referenced publications are incorporated herein by reference in their entirety. Furthermore, where a definition or use of a term in a reference, which is incorporated by reference herein, is inconsistent or contrary to the definition of that term provided herein, the definition of that term provided herein applies and the definition of that term in the reference does not apply.

The advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be said to fall therebetween.

What is claimed is:

1. A method of controlling a fluid flow, comprising the steps of:

inputting a momentum flow into the fluid flow;

inputting a swirling flow into the fluid flow; and varying the inputting of the swirling flow and the inputting of the momentum flow independently of one another.

2. The method of claim 1, wherein the momentum flow is inputted in an orientation that is normal to a surface of a body over which the fluid flow is passing.

3. The method of claim 1, wherein the swirling flow is inputted in an orientation such that a central axis, about which the swirling flow rotates, is normal to a surface of a body over which the fluid flow is passing.

4. The method of claim 1, wherein the momentum flow is inputted in an orientation that is normal to a surface of a body over which the fluid flow is passing, and the swirling flow is inputted in an orientation such that a central axis, about which the swirling flow rotates, is normal to the surface of the body over which the fluid flow is passing.

5. The method of claim 1, wherein the momentum flow is actively inputted.

6. The method of claim 1, wherein the swirling flow is actively inputted.

7. The method of claim 1, wherein the momentum flow and swirling flow are actively inputted.

8. The method of claim 1, wherein the inputting occurs near the time-averaged separation point on a body over which the fluid flow is passing.

9. The method of claim 1, wherein the inputting occurs at a plurality of actuator sites such that each actuator site includes a swirling flow input and each swirling flow input has an initial direction of rotation that is opposite of the initial direction of rotation of the swirling flow input of an adjacently located actuator site.

10. The method of claim 1, wherein the inputting occurs at a plurality of actuator sites such that each actuator site includes a swirling flow input and each swirling flow input has an initial direction of rotation that is in the same initial direction of rotation of the swirling flow input of an adjacently located actuator site.

11. A method of actively controlling a fluid flow, comprising the steps of:

inputting a momentum flow into the fluid flow;

inputting a swirling flow into the fluid flow, wherein the swirling flow is inputted in an orientation such that a central axis, about which the swirling flow rotates, is normal to a surface of a body over which the fluid flow is passing; and wherein the inputting of the momentum and the inputting of the swirling flow into the fluid flow are independently adjustable with respect to one another, thereby providing a tunable control input to perturb the fluid flow to modify the behavior thereof.

12. The method of claim 11, wherein the momentum is inputted in an orientation that is normal to a surface of the body over which the fluid flow is passing.

13. The method of claim 11, wherein the inputting occurs near the time-averaged separation point on the body over which the fluid flow is passing.

14. The method of claim 11, wherein the inputting occurs at a plurality of actuator sites such that each actuator site includes a swirling flow input and each swirling flow input has an initial direction of rotation that is opposite of the initial direction of rotation of the swirling flow input of an adjacently located actuator site.

15. The method of claim 11, wherein the inputting occurs at a plurality of actuator sites such that each actuator site includes a swirling flow input and each swirling flow input has an initial direction of rotation that is in the same initial direction of rotation of the swirling flow input of an adjacently located actuator site.

* * * * *